April 28, 1942.        J. C. ANDERSEN        2,280,778
GARDEN TOOL
Filed Sept. 29, 1939
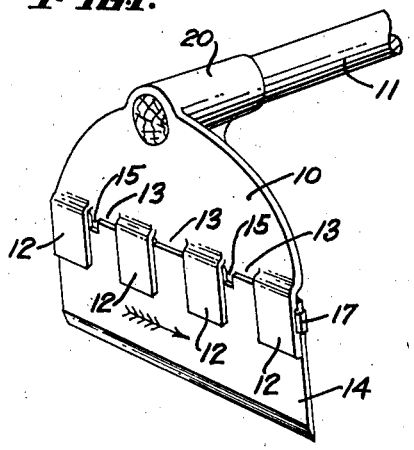
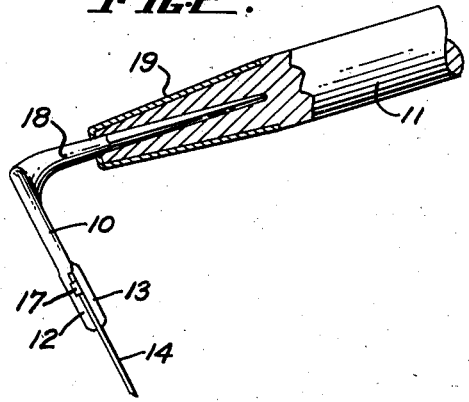
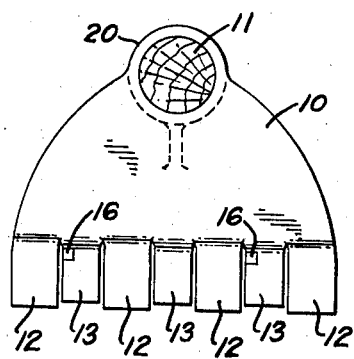
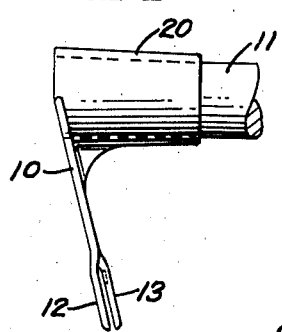
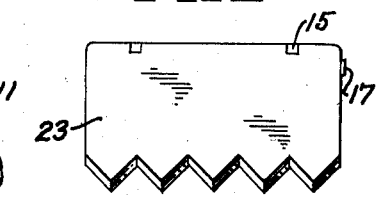
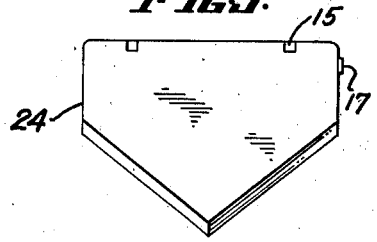
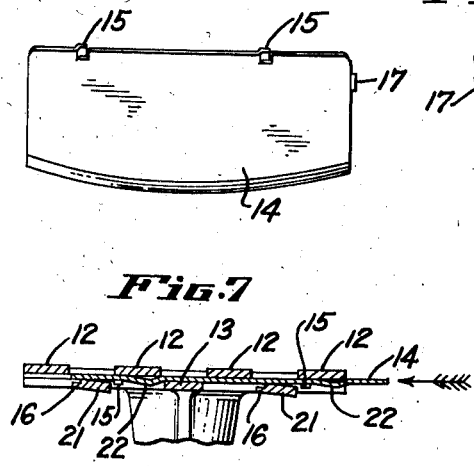
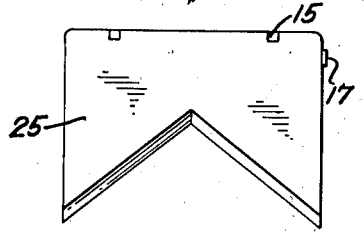
INVENTOR.
JOHN C. ANDERSEN
BY
ATTORNEY.

Patented Apr. 28, 1942

2,280,778

UNITED STATES PATENT OFFICE 2,280,778

GARDEN TOOL

John C. Andersen, Crockett, Calif.

Application September 29, 1939, Serial No. 297,060

3 Claims. (Cl. 306—25)

The present invention relates to garden tools of the hoe type and more particularly to an improvement which provides a detachable blade which may be removed for sharpening and/or renewal when worn out.

The object of the invention is to provide a new and improved hoe having a hardened steel blade which may be removed, sharpened and replaced or renewed in a simple and convenient manner.

Another object of the invention is to provide a new and improved blade supporting head for a garden tool of the character described in which the blade is secured upon the hoe with a simple interlocking connection and without resort to additional securing means.

Another object of the invention is to provide a garden tool of the hoe type with an improved head which will permit the easy and convenient interchange of a plurality of different blades to thus facilitate its use for different purposes.

Other objects and advantages will be in part evident to those skilled in the art and in part pointed out hereinafter in connection with the accompanying drawing, wherein there is shown by way of illustration and not of limitation preferred embodiments thereof.

In the drawing, wherein like numerals refer to like parts throughout the several views:

Figure 1 is a fragmentary perspective view showing a garden tool constructed in accordance with a preferred embodiment of the invention, Figure 2 is a fragmentary side elevation partly in section showing a modified form of the invention, Figure 3 is a front view in elevation of the tool illustrated in Figure 1 with the blade removed, Figure 4 is a fragmentary side elevation of the tool illustrated in Figure 3, Figures 5 and 6 are respectively a front and end view of a blade constructed in accordance with the invention, Figure 7 is a fragmentary sectional view showing a further modified form of the tool illustrated in Figure 1, and Figures 8, 9 and 10 show blades suitable for use with a tool constructed in accordance with the invention and having different types of cutting and/or earth working edges.

I am aware that others have, in the past, proposed and disclosed the use of a removable cutting blade upon a handle supporting head, but so far as I am aware, no one has yet provided such an arrangement wherein the blade is held upon the head without resort to the use of threaded means, such as screws and/or bolts or nuts. While these latter means operate effectively to retain the parts in cooperating relation, they are open to the objection that the threaded means often become loose and lost and as a more serious objection they become rusty and damaged and, therefore, impractical, particularly where a frequent removal of the blade is required.

As distinguished from the above, the present invention provides a garden tool in which the blade or different blades can be conveniently applied and removed for sharpening and/or interchange without resort to a threaded and/or other independent securing means. By providing a plurality of blades of different shape, the tool contemplated by this invention may also be used for a large number of different purposes. For example; hoeing, digging, hilling, cultivating, lawn trimming or weed cutting. The removability of the cutting blade also makes possible the use of a tempered steel blade upon a wrought iron, cast or mild steel head which lends to economy in the first cost.

As illustrated in Figures 1 to 6 of the drawing, the tool contemplated by the present invention comprises a head 10 having a flat portion which extends in a plane transverse to a handle 11 carried thereby and along the lower edge of this flat portion of the head 10 there is a plurality of co-extensive, staggered and opposed tongues alternately designated by the numerals 12 and 13 between which a blade 14 is adapted to be positioned with a lateral sliding movement. As shown, the arrangement contemplates the use of four of the tongues 12 that extend downwardly over the outside of the blade 14, and three of the tongues 13 which extend downwardly along the inside of the blade 14. With this arrangement it will be seen that the blade 14 will be held at its upper edge in what may be termed a mutilated groove with the tongues 12 and 13 forming the sides thereof. As a means for securing the blade 14 in this position and against accidental displacement, the blade 14, as will hereinafter more clearly appear, is provided with two offset tongues or bosses 15 which are adapted to engage recesses or slots 16 formed in one or more of the tongues 12 or 13. In the preferred arrangement the tongues 15 upon the blade 14 and the recesses 16 formed in the tongues of the head 10 are so arranged that these portions of the blade and tongues can be brought into interlocking relation by a slight lateral movement of the blade 14 with respect to the head 10 and which will bring the blade into its final position. As an additional securing means, the blade 14 may, if desired, also be provided with a small offset projection or detent 17 at one end that will prevent a reverse lateral movement of the blade 14 with respect to the head 10 after the projections 15 upon the blade 14 and the recesses 16 in the tongues 13 have been brought into interlocking relation. While this latter expedient will be desirable, it is to be understood that its use is not necessary as the tongues 12 and 13 may be so positioned as to provide a spring-like or tight fitting grip upon the blade 14 which will of itself serve to prevent any lateral displacement thereof when the tool is used in its normal and intended manner. As shown in Figure 2, the head 10 of the tool may be attached to the handle 11 by means of a shank 18 and a ferrule 19 rather than by the use of a socket 20, as illustrated in the other figures of the drawing.

In Figure 7 there is shown a modification of the invention in which one or more of the tongues 13, here designated by the numeral 21, are given a slight angular inclination with respect to their lateral dimension so that when the blade 14 is provided with a similar slight angular offset, as indicated at 22 in this figure of the drawing, the blade will be gripped between the tongues 12 and 21 with a wedging action. In this arrangement, the inclination of the blade engaging surface of the tongues 21 and the offset portions 22 upon the blade 14 will serve to hold the blade 14 against any further left-hand movement after the tongues 15 have engaged the recesses 16 formed along the innermost edge of the tongues 21. In connection with this arrangement it will be understood that instead of bending one or two of the tongues 13 into an angular position, as described above, it is contemplated that all of the tongues 12 and 13 may be thus inclined to provide a tight wedging engagement with the blade 14 provided the blade is likewise given a corresponding inclination at points corresponding to the adjacent tongues along its length.

In connection with the use of the tool here described, it will be noted that the blade 14 illustrated in Figure 1 has a straight cutting edge which is particularly suitable for hoeing and mixing, as is commonly practiced with tools of this character. The blade illustrated in Figure 5 is shown as having a rounded cutting edge and will be found particularly suited to the trimming of lawns and the like which require a cutting of sod, while the blades shown in Figures 8, 9 and 10 of the drawing and designated respectively by the numerals 23, 24 and 25 will be found particularly suitable for weed cutting, digging and cultivating in the manner generally applied to these operations.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a garden tool of the character described, the combination of a handle supporting head having a plurality of coextensive tongues arranged in staggered relation along one edge thereof and forming a mutilated channel between which the upper edge of a working blade is positioned, one or more of said coextensive tongues having a detent receiving recess in one edge thereof, an earth working blade having its upper edge positioned within the channel formed by the coextensive tongues upon said head, detent forming means carried by said blade adapted to be brought into cooperating relation with the recess upon said one or more of said coextensive tongues by a lateral movement of the blade and normally prevent a vertical displacement thereof from said head, and means also carried by said blade for preventing a reverse lateral movement of said blade with respect to said head when said detent forming means is positioned in cooperating relation with the recess upon said one or more coextensive tongues upon said head.

2. In a garden tool of the character described, the combination of a supporting head, an outwardly extending handle carried by said head, said head having a plurality of coextensive and opposed tongues formed integral therewith and arranged in staggered relation along a line transverse to the extending direction of said handle, a cutting blade positioned between said opposed tongues, means for securing said blade between said tongues comprising offset bosses formed upon said blade and cooperating recesses in one or more of said tongues which become interlocked upon a relative transverse sliding movement between said blade and said head, and detent means formed upon said blade for preventing a reverse relative transverse sliding movement of said blade when said blade is moved into its operative position upon said head.

3. In a garden tool of the character described, the combination of a supporting head, an outwardly extending handle carried by said head, said head having a plurality of coextensive and opposed tongues formed integral therewith and arranged in staggered relation to form a mutilated channel transverse to the extending direction of said handle, a cutting blade adapted to be positioned in the channel formed by said opposed tongues by a transverse sliding movement thereof with respect to said head, means for securing said blade in said channel comprising interlocking offset parts formed upon said blade and a recess in one or more of said tongues which interlock upon a relative transverse sliding movement in one direction between said blade and said head, and detent means formed upon said blade for preventing a reverse of said relative transverse sliding movement between said blade and said head when said blade is in its operative position upon said head.

JOHN C. ANDERSEN.